July 4, 1967  R. SYMONDS ET AL  3,329,164

MIXING DEVICES

Filed May 6, 1963

Inventors:-
Roy Symonds
Charles Anthony Lane
By
Dowell & Dowell
Attorneys 3,329,164
MIXING DEVICES
Roy Symonds, Addington, Croydon, and Charles Anthony Lane, Cheam, Surrey, England, assignors to Waddington & Duval (Holdings) Limited, London, S.W. 15, England
Filed May 6, 1963, Ser. No. 278,297
Claims priority, application Great Britain, May 14, 1962, 18,538/62
4 Claims. (Cl. 137—604)

This invention relates to mixing devices, and is especially concerned with a device for mixing a minor amount of a secondary liquid with a major amount of primary liquid.

One form of such a device has a venturi passageway through which the primary liquid is passed creating a suction in a pipe connected to the venturi throat to draw the secondary liquid into the stream of primary liquid, in an amount, other factors remaining constant, depending upon the rate of flow of the primary liquid. This device is, however, effectively limited to a fairly small range of rates of flow of the primary liquid, since if the diameter of the throat of the venturi is large then, over the range of primary liquid inlet pressures normally encountered in practice, the suction at low rates of flow of primary liquid is too low for many purposes, and if the throat diameter is relatively small it creates a restriction to the flow of primary liquid, preventing high flow rates from being achieved.

A venturi mixing device in accordance with this invention has a passage of variable cross-sectional size, for the primary liquid, bypassing the venturi thus providing a variable control for the flow of primary liquid through the venturi. The diameter of the throat of the venturi may be made fairly small, enabling the device to provide a good suction for the introduction of secondary liquid at low rates of primary liquid flow with the by-pass fully or partly throttled and also provide for a comparatively high rate of primary liquid flow when the by-pass is fully open with the major portion of the primary liquid flowing through the by-pass.

It will be realized that the means for altering the size of the by-pass passage to control the rate of flow through the by-pass may be used also as a means of controlling the amount of secondary liquid mixed with the primary liquid. This is because, for any given inlet pressure, variation in the volume of the flow through the by-pass produces an alteration in the volume of the primary liquid flowing through the venturi, with a consequent alteration in the suction produced and hence of the volume of secondary liquid injected into the primary liquid.

The divergent outlet section of the venturi may conveniently have an angle of divergence of from 2½° to 7½° and the throat section have its length and transverse dimensions in a ratio of at least 3:1.

In some cases it will be found to be desirable to provide an independent means of adjustment of the flow of secondary liquid.

As an example, an embodiment of the invention adapted for mixing small amounts of detergent with water flowing from a tap, will now be described with reference to the accompanying drawing in which.

Figure 1:
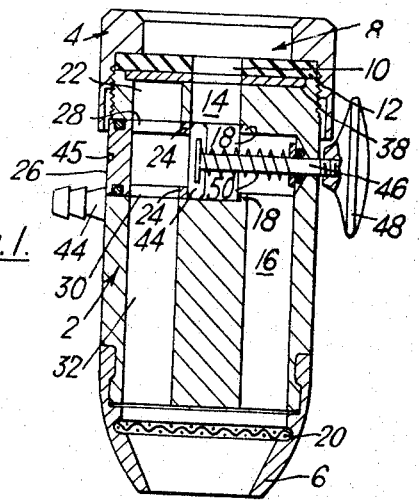
FIGURE 1 is a cross-section through the mixing device on the line I—I of FIGURE 2 with the cap in position.

The mixing device shown in the drawing comprises a body portion generally indicated at 2 having a cap 4 screw threadedly attached at one end and a nozzle 6 at the other end. The cap is provided with a central opening 8 communicating with an opening 10 through a rubber pad 12 held between the cap and body and adapted to receive the end of the nozzle of a water tap or the like to which the device is secured by any convenient means such for example as a number of small screws. The nozzle of the tap when in position communicates through the opening 10 with a passage 14 formed in the body of the device.

The passage 14 communicates with the upper end of a primary liquid (water) outlet passage 16 through a valve seating 18. The lower end of the passage 16 is open to the interior of the nozzle 6 through an anti-splash screen 20.

The passage 14 also communicates with a passage 22 through a valve seating 24 formed at the inner end of a hollow plug 26 and through the interior of the plug. The plug screw-threadedly engages in the body portion 2 and is formed with a slot 28 and a hole 30 which, in the position of the block shown in FIGURE 1, enable the hollow interior of the plug to communicate both with the passage 22 and with a by-pass passage 32 extending from the plug to the nozzle.

The passage 22 communicates with a venturi passage 34, through a groove 36 extending across the top of the body portion 2 and normally having its upper side closed by a metal plate 38 which is held in position when the cap 4 is secured to the body portion.

The venturi passage 34 passes through the body portion and terminates at its lower end at the nozzle 6. The venturi portion of the passage has an elongated throat part 40 located between the convergent and divergent parts of the venturi and passing through a chamber 42 connected to an outwardly extending pipe 43 which, in use, is connected to a supply of secondary liquid (detergent). The arrangement is such that as water flows through the venturi passage a suction is created in the pipe 43 to cause detergent to be injected into the water.

The angle of divergence of the outlet part of the venturi shown in the drawings is 5° and the throat section 40 has a length to transverse diameter ratio of 4½ to 1. The minimum diameter of the throat section of the venturi is .125 inch.

The flow through the passage 32 by-passing the venturi passage, is controlled by the angular position of the plug 26. When the hole 30 is in aligment with the passage 32, the maximum flow of liquid through the by-pass can take place. On progressive turning of the plug 26 through 90° by means of a screwdriver or the like engaging in slot 45, the upper end of the by-pass passage is progressively closed, the slot 28 being arranged so that the interior of the plug communicates with the passage 22 throughout the 90° turning of the plug. The minimum diameter of the by-pass passage is .375 inch when the hole 30 is in alignment with the passage.

The control of whether the water from the passage 14 flows either to the interior of the plug 26, through the valve seating 24, or to the passage 16 through the valve seating 18 is achieved by means of a valve member 44 secured at the inner end of a rod 46 operated by a knob 48 located on the outside of the body portion of the device. The element 44 is biased by means of a light spring 50 to the position shown in FIGURE 1 in which it seats on the seating 24 so that water flowing through the passage 14 passes into the passage 16 and water only flows from the device. On pulling the knob outwardly the valve member 44 seats on the valve seating 18 so that water will flow from the passage 14 through the seating 24 into the interior of the plug 26 and from thence into the by-pass passage 32 if this is open, and into the passage 22 leading to the venturi passage 34 so that a mixture of water and detergent will flow from the device.

Figure 2:
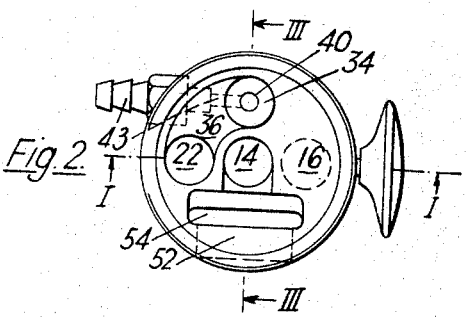
FIGURE 2 is a plan of the device with the cap removed.
Figure 3:
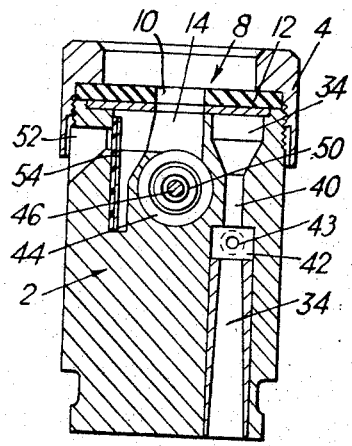
FIGURE 3 is a section on the line III—III of FIGURE 2 with the nozzle removed.

The passage 14 is connected to atmosphere through an opening 52 (see FIGURES 2 and 3) passing through the side of the body portion and normally closed by means of a floating valve element 54 which is held in the closed position by reason of the pressure exerted by the water passing through the passage 14. If the water supply from the mains, to which the tap is connected, should fail, creating a suction in the water supply pipe, then the valve element 54 will move inwardly from the position shown in FIGURE 3 enabling air to pass through the passage 52 into the water supply mains to prevent contamination of the supply by detergent or the like.

When the device is in its normal operating position as shown in FIGURE 1, water from the tap will flow through the passages 14, 16 to the nozzle 6 to provide a flow of primary liquid only. No liquid is flowing through the venturi passage and so there is no suction tending to cause secondary liquid to enter through the pipe 43.

When it is desired to inject detergent into the water supply the knob 48 is pulled out so that the valve element 44 closes the seating 18 and opens the seating 24. The valve element will then be held in the new position against the light pressure of spring 50, by reason of the water pressure acting on its face until such time as the tap is turned off or the knob 48 is manually pushed inwardly. In this position water passes from the passage 14 through the plug 26 and slot 28 into the passages 22 and 36 and down the venturi passage 34 creating a suction in the pipe 43 so that a quantity of detergent is injected into the water at the chamber 42. The presence of the chamber 42 at the point of injection of the detergent helps to reduce cavitation effects.

Control of the rate of flow of water passing through the venturi and hence of the suction in the pipe 43, is provided by the screw plug 26. In the position shown in FIGURE 1 the hole 30 is fully opened to the by-pass passage 32 so that a comparatively large volume of water flows through the by-pass passage and not through the venturi. As explained the volume of the water flowing through the by-pass rather than through the venturi can be progressively reduced on turning of the screw plug 26 or can be altogether stopped.

When applied to a tap normally providing from 1¼ to 2½ gallons per minute, the by-pass plug would be turned through 90° from the position shown in FIGURE 1 to close the by-pass if a minimum concentration of ½ oz./ gallon of high viscosity detergent were required. When applied to a tap normally delivering from 2½–3½ gallons per minute of water, the plug will be turned so that the by-pass is partially open and the same minimum concentration maintained.

If, however, lower concentration and/or lower viscosity secondary liquids were required the by-pass would be opened more fully. Under these conditions the working range of the device may be extended substantially beyond 3½ gallons per minute with the major portion of the water flowing through the by-pass passage 32.

The device would normally be pre-set for a particular installation and thereafter will inject a substantially constant proportion of detergent to water irrespective of variations in the flow rate of the water caused by throttling the tap or by variations in the pressure of the water supply.

A mixing device in accordance with the invention may, in general, be used for a great many purposes and for a great variety of rates of fluid flow. For example, it is envisaged that a device in accordance with the invention may be used for injecting additives into petrol or paraffin with a flow rate of primary liquid of 250 gallons per minute or even higher.

We claim:

1. A mixing device comprising a body portion adapted to be secured to a tap or other like source of primary liquid with an inlet in the body portion open to the interior of the tap, said body having three passages for primary liquid from the tap or the like passing through it between the inlet and an outlet, the first passage having a venturi section the throat of which is provided with a connection for a source of secondary liquid to be injected into the primary liquid when this is flowing through the venturi section, the second of said passages by-passing said venturi passage; control means for said by-pass adjustable to vary the minimum cross-section of said by-pass passage and thus control the amount of primary liquid which can flow therethrough, the third passage extending between the inlet and the outlet through a valve seat; and valve means for said valve seat movable between a position in which the said third passage is closed and said first and second passages are open to the inlet and a position in which the third passage is open to, and said first and second passages are closed to said inlet.

2. A device as claimed in claim 1 in which the control means comprises a plug having a hollow interior and formed with a hole which is arranged in one position of the plug to connect the hollow interior with the said by-pass passage and in another position of the plug to cut off communication and giving any degree of partial cut-off between these two positions, the hollow interior being in communication with the inlet and with the said venturi passage.

3. A device as claimed in claim 2 in which the hollow interior of said plug is open to the inlet through a valve seat onto which the said valve means seat when in the position closing said first and second passage from communicating with the inlet.

4. A mixing device comprising a body portion adapted to be secured to a tap or other like source of primary liquid with an inlet in the body portion open to the interior of the tap, said body having three passages for primary liquid from the tap or the like passing through it between the inlet and an outlet, the first passage having a venturi section the throat of which is provided with a connection for a source of secondary liquid to be injected into the primary liquid when this is flowing through the venturi section, the second of said passages by-passing said venturi passage; control means for said by-pass passage adjustable to vary the minimum cross-section of said by-pass passage and thus control the amount of primary liquid which can flow therethrough, the third passage extending between the inlet and the outlet through a valve seat and valve means for said valve seat movable between a position in which the said third passage is closed and said first and second passages are open to the inlet and a position in which the third passage is open to and said first and second passages are closed to said inlet; said valve element being biased to the position in which the inlet communicates with the said third passage, but on movement to its other position is arranged in use to be held in said other position by reason of the pressure of the primary liquid acting on the face of said valve means until such time as the primary liquid supply is cut-off when the valve means is returned to its normal position by the biasing means.

References Cited

UNITED STATES PATENTS

| | | | |
|---|---|---|---|
| Re. 25,037 | 9/1961 | Brazier | 137—604 X |
| 1,887,836 | 11/1932 | Faber | 137—604 X |
| 1,967,909 | 7/1934 | Sonner | 239—318 X |
| 2,233,965 | 3/1941 | Strouink | 137—604 X |
| 2,757,047 | 7/1956 | Friedmann | 137—604 X |
| 2,844,407 | 7/1958 | Deport | 137—604 |

FOREIGN PATENTS

| | | |
|---|---|---|
| 217,460 | 2/1958 | Australia. |
| 818,606 | 4/1957 | Great Britain. |

WILLIAM F. O'DEA, *Primary Examiner.*

D. H. LAMBERT, *Assistant Examiner.*